(12) United States Patent
Olsson et al.

(10) Patent No.: US 7,195,230 B2
(45) Date of Patent: Mar. 27, 2007

(54) OPTICAL FIBRE FEED ARRANGEMENT

(75) Inventors: Bertil Olsson, deceased, late of Näsviken (SE); by Agneta Fast-Karberg, legal representative, Bålsta (SE); by Maria Berglund, legal representative, Näsviken (SE); John Eriksson, Matfors (SE); Gojko Radojevic, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 197 days.

(21) Appl. No.: 10/507,474

(22) PCT Filed: Mar. 5, 2003

(86) PCT No.: PCT/SE03/00368

§ 371 (c)(1), (2), (4) Date: Mar. 3, 2005

(87) PCT Pub. No.: WO03/077005

PCT Pub. Date: Sep. 18, 2003

(65) Prior Publication Data

US 2005/0224549 A1    Oct. 13, 2005

(30) Foreign Application Priority Data

Mar. 11, 2002 (SE) .................................. 0200729

(51) Int. Cl.
*H02G 1/08* (2006.01)

(52) U.S. Cl. .............. 254/134.3 FT; 226/91; 254/134.3 SC

(58) Field of Classification Search ....... 254/134.3 FT, 254/134.3 SC; 140/93 R, 93 A; 242/157 R; 226/91

See application file for complete search history.

(56) References Cited

U.S. PATENT DOCUMENTS

| | | | | |
|---|---|---|---|---|
| 3,610,296 | A | * | 10/1971 | Kabel ...................... 140/93.2 |
| 3,656,520 | A | * | 4/1972 | Caffa ......................... 81/430 |
| 4,372,535 | A | | 2/1983 | Gibson et al. |
| 4,410,019 | A | * | 10/1983 | Suzuki .................... 140/123.6 |
| 4,615,469 | A | * | 10/1986 | Kishi et al. ................. 222/327 |
| 5,195,435 | A | * | 3/1993 | Morrone et al. ............ 101/151 |
| 5,217,049 | A | * | 6/1993 | Forsyth .................... 140/93.6 |
| 5,492,156 | A | * | 2/1996 | Dyer et al. ................ 140/123.6 |
| 5,503,369 | A | * | 4/1996 | Frost et al. ......... 254/134.3 FT |
| 5,921,290 | A | * | 7/1999 | Dyer et al. ............... 140/123.6 |
| 6,615,436 | B1 | * | 9/2003 | Burch et al. .............. 15/104.33 |

FOREIGN PATENT DOCUMENTS

WO    WO9934492 A1    7/1999

OTHER PUBLICATIONS

Swedish Patent Office, International Search Report for PCT/SE03/00368, dated Jun. 2, 2003.

* cited by examiner

*Primary Examiner*—Emmanuel M Marcelo

(57) ABSTRACT

The present invention concerns a procedure and a system for feeding optical fiber cables into a pipeline with the help of an installation device at adjustable speed. In order to prevent damage during the advancement of the optical fiber cable the engine (15) of the installation device has been supplied with a friction safety clutch (17) exerting pressure on a moving coil (18, 23).

15 Claims, 3 Drawing Sheets

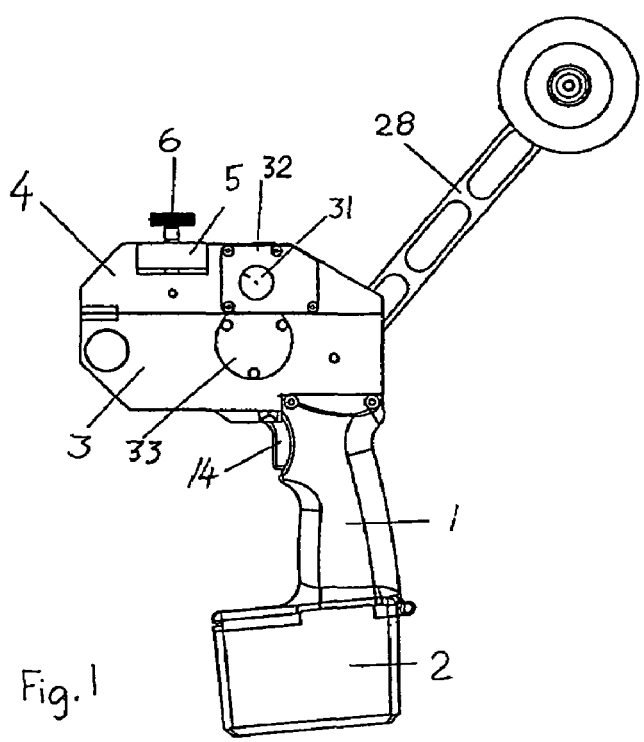
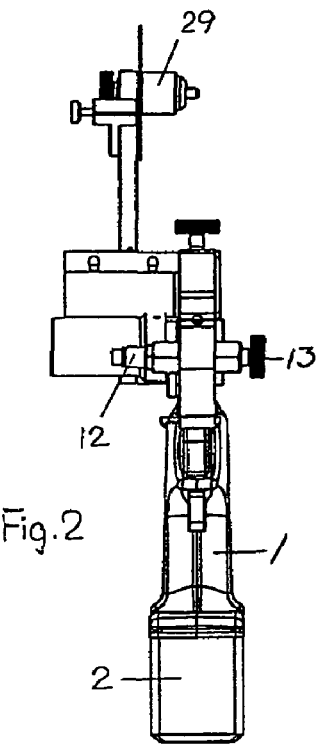
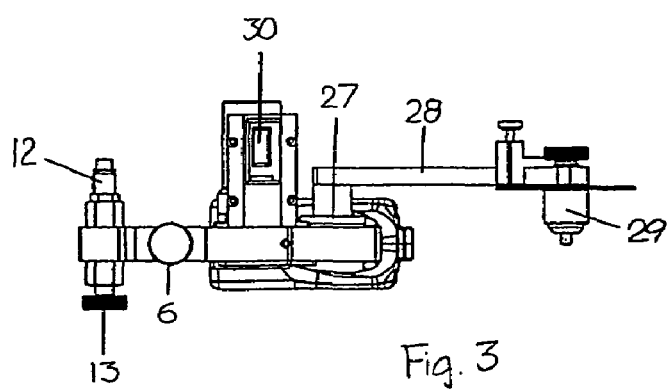

OPTICAL FIBRE FEED ARRANGEMENT

TECHNICAL FIELD OF THE INVENTION

The present invention concerns a method to be used for feeding at adjustable speed of an optical fibre cable into a pipeline/duct, and an arrangement devised for adjustable feeding of an optical fibre cable into the same. The feeding arrangement and method are primarily intended to be used for installations of optical fibre cables in pipeline systems located outdoors or between residential units and a central unit, such as between several apartments in an apartment building and a central coupling unit located in the house's cellar or similar.

DESCRIPTION OF RELATED ART

It has been known for some time that optical fibres or optical fibre cables can be blown or sucked into pipelines/ducts, either by creating overpressure by means of compressed air supply so that the optical fibre or optical fibre cable is blown into the pipeline, or by creating underpressure at the end of the pipeline/duct, so that the optical fibre or the optical fibre cable is sucked into it.

SUMMARY OF THE INVENTION

In order to simplify the handling of optical fibre cables in connection with their feed into pipelines/ducts and to ensure that they are not exposed to undesirable pressure during the feeding process, which could result in the bending or breaking of the cables during this process, a feeding device located in the feeding mechanism has been supplied with a friction safety clutch which regulates the feed of the optical fibre cable when feed resistance increases. For additional regulation of the advancement of the optical fibre cable the feeding mechanism can be regulated by adjusting the air stream and/or the rotation speed of the feeding wheel. To further facilitate the operation of the feeding arrangement it has been designed as a hand-tool which needs to be connected to just one or more energy sources.

The invention is described below in more detail with the help of a proposed method of execution and with reference to the enclosed pages containing drawings.

BRIEF DESCRIPTION OF THE DRAWINGS

FIGS. 1–3 show different views of the feeding device in accordance with the invention.

DETAILED DESCRIPTION OF EMBODIMENTS

Figure 4:
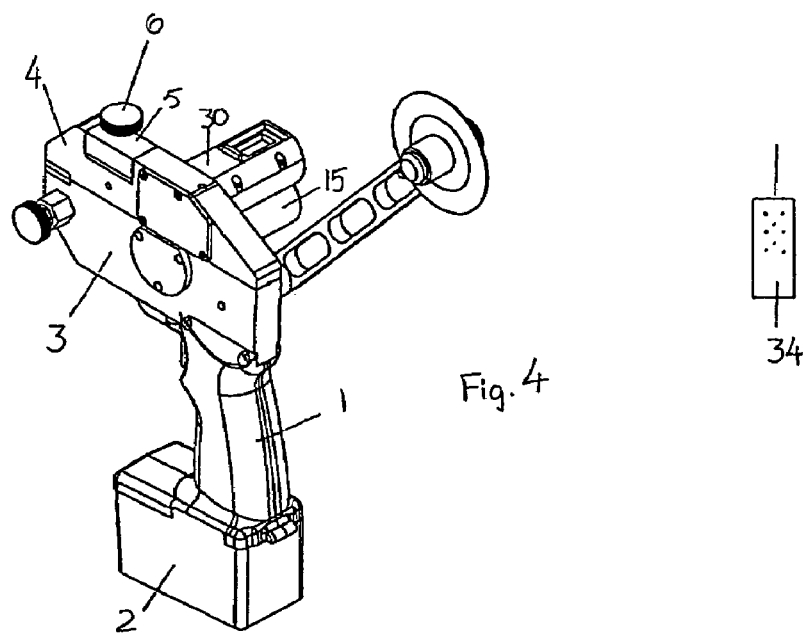
FIG. 4 shows the feeding device in perspective.
Figure 5:
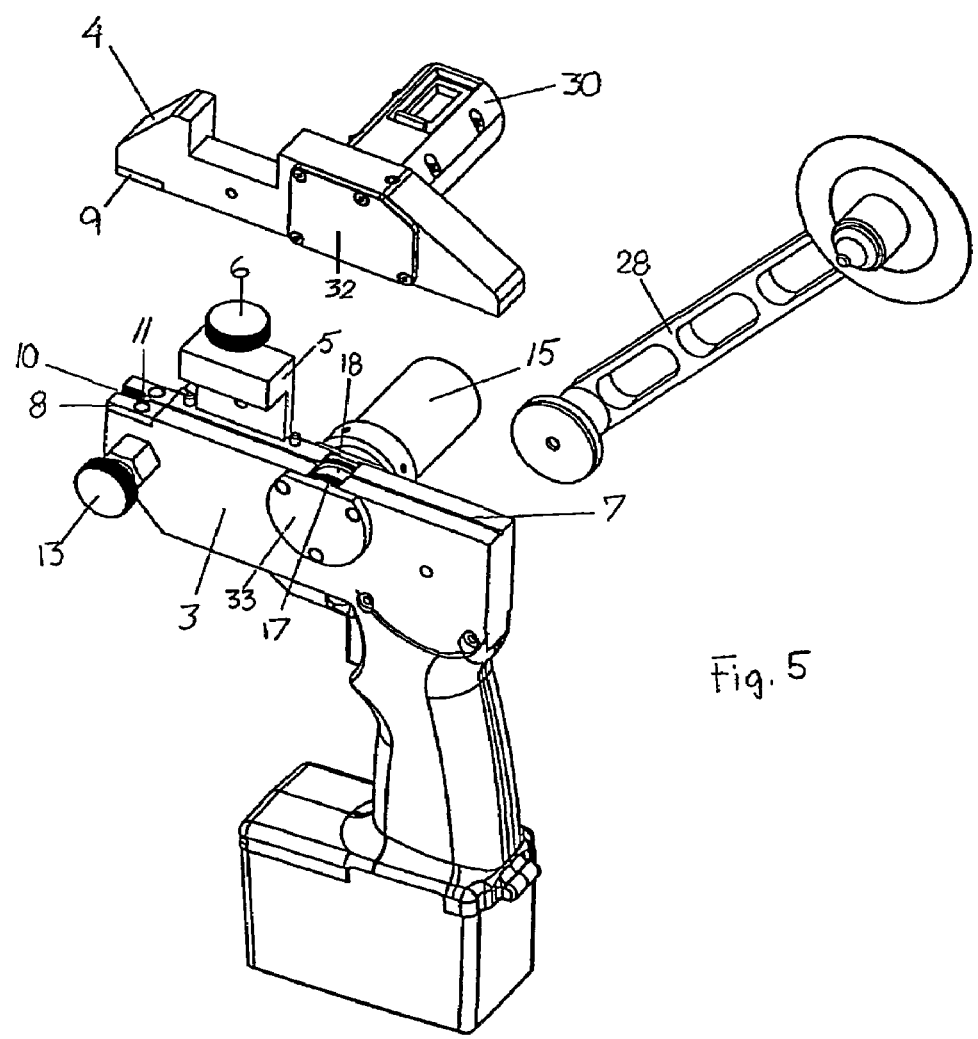
FIG. 5 shows the feeding device when disassembled.

FIGS. 1–5 show how a feeding device can be constructed in accordance with the invention. The feeding device consists of a handgrip unit 1 containing a battery 2 and of a feeding system for optical fibre cables. The feeding arrangement consists in turn of a lower part 3 and an upper part 4 connected with each other by a guide bar 5 which is further equipped with an adjustable positioning screw 6. With the help of the positioning screw 6 the distance between the upper part and the lower part can be regulated, so that the optical fibre cable can be placed correctly between the upper and the lower part when open, and when the two parts are brought together it will find itself in a groove 7 between the upper part and the lower part. The cross-section of the groove has been designed in such a way as to be able to hold a maximum of the cross-sectional area of the optical fibre cable. At the front of the upper and lower parts removable extension units 8, 9 of suitable material have been fastened, which form together a hollow space 10 of a circular cross-section, for example, into which the end of a pipeline/duct can be entered, and through which the optical fibre cable is fed. Adjacent to the removable extension units is a space 11 for compressed air to be supplied for feeding the optical fibre cable into the pipeline. The lower section of this space is connected to a compressor 12 by means of an adjustment screw 13 for regulation of the supply of compressed air. The lower section is further connected to a handgrip unit 1 which can be designed like a pistol-type handle, containing a trigger 14 for the regulation of the number of revolutions of the engine 15 pushing the optical fibre cable forward. In addition to the regulator of the rotational frequency the section also contains a switch for changing the direction of the feed and a resetting device. The engine 15 is fastened to the lower part, and its driving axle 16 operates through a friction safety clutch 17 upon a moving coil 18. The engine can be either electrically driven or it may be powered by compressed air. Electric operation can be provided by means of a rechargeable battery in the battery component 2 fastened to the handgrip's lower part 1, or it may be connected to an external power supply via the rotational frequency regulator. When using the electric engine only, the optical fibre cable can be fed into the pipeline without any supply of compressed air to the extension units. When the engine is operated by compressed air, its compressor can be connected to the compressor used for the feeding of the optical fibre into the pipeline. The friction safety clutch 17 ensures controlled forward feed of the optical fibre cable due to the fact that at constant rotation of the engine and increased resistance felt by the optical fibre cable during its forward feed into the pipeline the moving coil will skid in the opposite direction to the driving axle, preventing the cable from being exposed to forces going in the opposite direction, which could result in the bending or breaking of the optical fibre cable in the feed area. By further providing the clutch with a possibility of regulation, a suitable safety level can be achieved for the forward-feed of the optical fibre cable. Thanks to the flexibility provided by the friction safety clutch, the force of the forward motion of the optical fibre cable can be regulated, depending on the resistance encountered in the pipeline, and the forward feed of the cable can thus be optimised.

Figure 6:
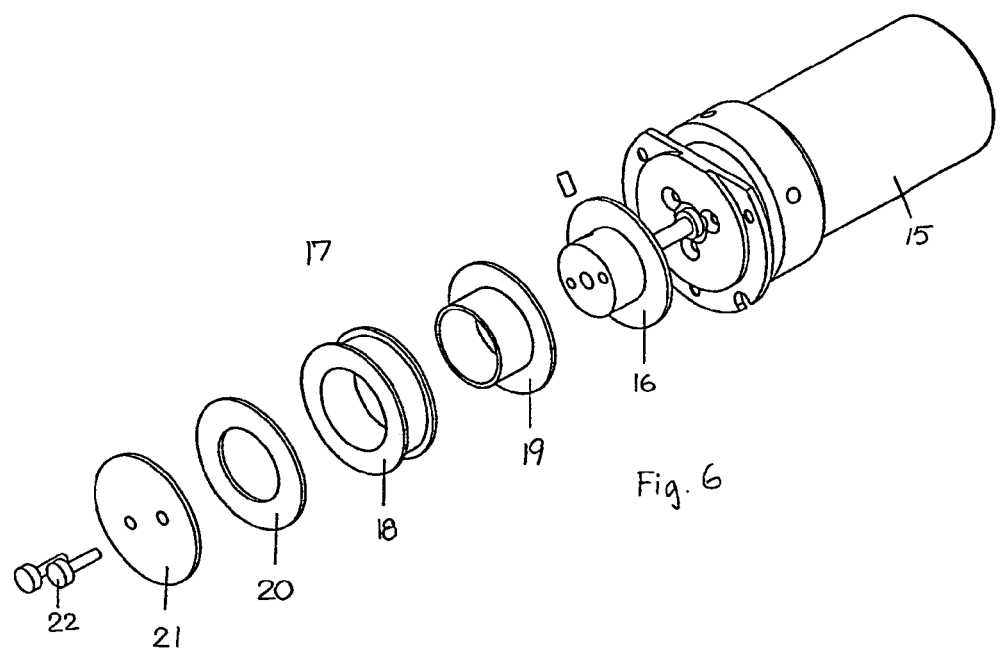
FIGS. 6 and 7 provide details of how friction safety clutches can be arranged in relation to the feeding device.
Figure 7:
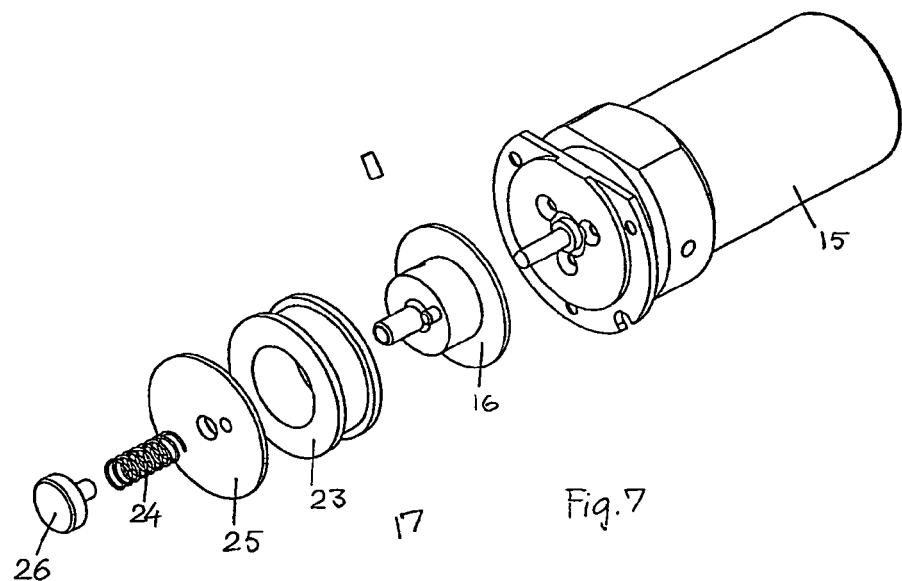

The friction safety clutch 17 may consist of two circular contact surfaces 19, 20 made of low-friction material, operating between the end of the driving axle 16 and the moving coil 18 made of metal, as well as between the said moving coil and an external plate (21), which is connected to the driving axle's end by means of adjustment screws 22 (see FIG. 6). The contact surfaces can thus be pressed against the moving coil with controlled force. If the feed of the optical fibre cable is obstructed in the pipeline, the contact surfaces of the friction safety clutch will start skidding against the moving coil, impeding its movement, so that the cable will not be pushed forward at the risk of being damaged. The friction safety clutch 17 may also consist of a moving coil 23 made of low-friction material, operating between the driving axle's end 16 and an external, spring-loaded 24 plate 25 made of, for example, metal. The force exerted by the spring can be regulated by means of a screw 26 in order to attain a desirable degree of friction by the clutch, thus preventing damage of the optical fibre cable during its forward feed into the pipeline.

The upper part contains further a spool holding device 27, 28 with a spool support 29 on which a spool with an optical fibre cable can be fastened. The holding device for the spool arm has been designed in such a way that the position of the spool arm can be adjusted as desired. The upper part contains also a revolution counter 30. With the help of the rev. counter the number of revolutions may be counted, or the length of the optical fibre cable fed into the pipeline measured by means of a measuring wheel 31 which is turned by the running optical fibre cable being fed into the pipeline. The measuring wheel can be spring-loaded, so that the pressure of the optical fibre cable which is being fed into the pipeline can be regulated, which helps to ensure that the cable advances correctly. The measuring wheel should preferably be made conspicuous and contain some sort of marking, so that the wheel's rotations can be observed, which is of great use to the user of the installation device. This can be done by providing a transparent lock 32 for the measuring wheel, ensuring its protection and visibility of its rotations. The user will thus be able to see whether the measuring wheel is rotating or not during the forward feed of the optical fibre cable by the moving coil, which is why it is a good idea to provide also the moving coil with some visible marking so that its rotations can be observed. This can be done by supplying a transparent lock 33 for the moving coil so that it can be protected and visible.

The installation device may either be held by hand or it may be placed on a tripod. A roll of optical fibre cable is placed on the spool arm and one end of the cable is introduced into the groove space between the upper and the lower part. To regulate the distance between the upper and the lower part a positioning screw is used for the raising or lowering of the upper part in relation to the lower part. When the two parts are brought together the measuring wheel will press the optical fibre towards the moving coil with the help of the spring. The optical fibre cable is further led through the interacting removable extension units, and its one end is stuck into a pipeline which has been placed in the extension units. When the engine is started and compressed air is supplied, the optical fibre cable will be fed into the pipeline. Depending on the feed requirements the positioning screws are adjusted in a suitable way, and an operator may monitor the feed.

When a tripod is used, the installation device can be manoeuvred from a distance with a remote control 34. Once suitable air supply and a desirable degree of friction has been ensured with the help of the adjustment screws, the installation device placed on a tripod may easily be manoeuvred by means of the remote control, and the operator has more time to watch over and regulate the forward feed of the cables. The invention is, naturally, not limited to the above-described method of execution illustrated in the drawings, and can be modified within the framework of the attached patent claims.

The invention claimed is:

1. An apparatus for feeding an optical fibre cable into a pipeline, comprising:
    a feeding device having an upper part and a lower part wherein when the upper part is joined to the lower part, a forward portion of the feeding device forms a hollow space for feeding the optical fibre cable into the pipeline and a remaining portion of the joined upper and lower part forms a groove for receiving the optical fibre cable;
    an engine coupled to the groove for advancing the optical fibre cable through the hollow space into the pipeline;
    a friction safety clutch connected to the engine for regulating the forward feed of the optical fibre cable when feed resistance in the pipeline increases.

2. The apparatus of claim 1, further comprising;
    a receptacle for receiving compressed air into the feeding device's hollow space for regulating advancement of the optical fibre cable into the pipeline.

3. The apparatus of claim 1, wherein the friction safety clutch comprises:
    contact surfaces comprising low-friction material for pressing against both sides of a moving coil connected to the engine for feeding the optical fibre cable through the groove into the hollow space; and
    means for adjusting operation of the safety clutch according to the optical fibre cable used and according to the pipeline parameters.

4. The apparatus of claim 3, wherein force for pressing against either side of the moving coil is regulated to attain a controlled degree of friction by the friction safety clutch.

5. The apparatus of claim 1, wherein the engine is operated by compressed air.

6. The apparatus of claim 1, wherein the engine is an electrical motor.

7. The apparatus of claim 1, wherein the hollow space comprises a circular cross section capable of receiving the end of the pipeline.

8. The apparatus of claim 1, further comprising a measuring wheel for registering the length of the cable into the pipeline, wherein the measuring wheel can regulate pressure exerted on the optical fibre cable being fed into the pipeline.

9. A method for feeding an optical fibre cable into a pipeline, comprising the steps of:
    utilizing a feeding device having a groove connected to a hollow space both formed by an upper and lower part, wherein the hollow space is for receiving the optical fibre cable from the groove and connecting the feeding device to the pipeline;
    advancing the optical fibre cable through the hollow space into the pipeline utilizing an engine coupled to the groove; and
    regulating the forward feed of the optical fibre cable when feed resistance increases in the pipeline, using a friction safety clutch connected to the engine.

10. The method of claim 9, further comprising the step of:
    receiving compressed air into the feeding device's hollow space for regulating advancement of the optical fibre cable into the pipeline.

11. The method of claim 9, wherein the step of regulating the forward feed of the optical fibre cable using a friction safety clutch connected to the engine when feed resistance increases, further comprises:
    the friction safety clutch pressing against both sides of a moving coil, connected to the engine, for advancing the optical fibre cable through the groove and the hollow.

12. The method of claim 11, further comprising:
    regulating force on the moving coil using the friction safety clutch against both sides of the moving coil to attain a controlled degree of friction.

13. The method of claim 9, wherein the engine is operated by compressed air.

14. The method of claim 9, wherein the engine is an electrical motor.

15. The method of claim 9, further comprising;
    receiving the end of the pipeline into the hollow space;
    the optical fibre feeding into the groove at a back portion of the feeding device,
    advancing the optical fibre cable through the groove into the hollow space utilizing the engine and the moving coil; and
    receiving compressed air for regulating forward feeding of the optical fibre cable into the pipeline.

* * * * *